United States Patent
Battista et al.

(10) Patent No.: US 7,984,262 B2
(45) Date of Patent: Jul. 19, 2011

(54) DATA TRANSMISSION FOR PARTITION MIGRATION

(75) Inventors: Robert J. Battista, Rochester, MN (US); Jonathan Ross Van Niewaal, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 775 days.

(21) Appl. No.: 12/014,851

(22) Filed: Jan. 16, 2008

(65) Prior Publication Data

US 2009/0182970 A1    Jul. 16, 2009

(51) Int. Cl.
G06F 12/00 (2006.01)
G06F 9/455 (2006.01)

(52) U.S. Cl. ........................... 711/173; 718/105
(58) Field of Classification Search .................. None
See application file for complete search history.

(56) References Cited

U.S. PATENT DOCUMENTS

| | | | |
|---|---|---|---|
| 2004/0055004 A1* | 3/2004 | Sun et al. | 718/108 |
| 2007/0266383 A1* | 11/2007 | White | 718/1 |
| 2008/0235482 A1* | 9/2008 | Armstrong et al. | 711/173 |
| 2009/0007106 A1* | 1/2009 | Araujo et al. | 718/1 |
| 2009/0089781 A1* | 4/2009 | Shingai et al. | 718/1 |
| 2009/0113109 A1* | 4/2009 | Nelson et al. | 711/6 |

OTHER PUBLICATIONS

Zhao et al. "Experimental Study of Virtual Machine Migration in Support of Reservation of Cluster Resources" Published Nov. 12, 2007, ACM 978-1-59593-897-8; pp. 8.*
Richmond et al. "A New Process Migration Algorithm", published Jan. 1997, ISSN: 0163-5980; pp. 31-42.*
Nelson, Michael et al., "Fast Transparent Migration for Virtual Machines", Proceedings of USENIX '05: General Track, 2005 USENIX Annual Technical Conference, Anaheim, California, USA Apr. 10-15, 2005, pp. 391-394.

* cited by examiner

*Primary Examiner* — Kaushikkumar Patel
(74) *Attorney, Agent, or Firm* — Wood, Herron & Evans, LLP (57) ABSTRACT

A method, apparatus, and program product manage data during a logical partition migration. Data from a source logical partition is transformed into partition state records by a source migration services partition. The records are transmitted to a target migration services partition that processes the records and loads the data into a target logical partition. The logical partition migration may take place from a first computer to a second computer, or solely in a first computer. The migration services partitions may be configured with multiple virtual processors to create and send, or receive and process, partition state records in parallel.

21 Claims, 4 Drawing Sheets

DATA TRANSMISSION FOR PARTITION MIGRATION

FIELD OF THE INVENTION

The present invention relates to computing systems, and more particularly to logically partitioned computers and partition migration.

BACKGROUND OF THE INVENTION

Modern requirements for a computer system may require that a computer be utilized to run several operating environments, or operating systems, at once. In a typical embodiment, a single logically partitioned computer can run a plurality of operating systems in a corresponding plurality of logical partitions. Each operating system resides in its own logical partition, with each logical partition allocated a part of a processor, an entire processor, or multiple processors from the computer. Additionally, a portion of the computer's memory is allocated to each logical partition. All of the logical partitions are under the control of a partition manager. The partition manager is typically a part of the system firmware and manages the allocation of resources to the operating systems and logical partitions.

It may be desirable in some logically partitioned computers to support the migration of a logical partition to a different logically partitioned computer. This process is generally referred to as "partition migration." A partition migration may be in response to a logical partition failure, operating system failure, optimization plan, user request, or application request. A typical partition migration will suspend user access to the logical partition, then migrate the data and state of a source logical partition on a source computer to a target logical partition on a target computer. User access and control of the target logical partition is granted only after it has been migrated.

The time required to complete a migration, however, can be problematic, particularly in high availability and high performance systems where any downtime is considered highly undesirable. More complex logical partitions may span multiple processors and multiple terabytes of memory, and migrations of such partitions may take hours to complete, and even on smaller partitions that span a single processor and limited memory, partition migration may take still interrupt user access for several minutes or more. It is desirable that partition migration interruption be as "invisible" as possible to users with minimal interruption of user access, so a continuing need exists in the art for a manner of minimizing interruption of user access resulting from partition migrations.

Significant interruption issues may also occur when two or more logical partitions need to be migrated. A typical partition migration will transfer the data of two or more logical partitions sequentially, rather than concurrently. A typical partition migration may suspend access of each user to each of the logical partitions to be migrated while each logical partition is separately migrated. As a result, user access is often impacted to an even greater extent when multiple logical partitions need to be migrated.

Consequently, there is a continuing need for improving logical partition migration and minimizing the user interruption resulting therefrom.

SUMMARY OF THE INVENTION

Embodiments of the invention provide for managing data during a migration of data from a source logical partition to a target logical partition in a manner that supports multiple concurrent migrations, provides for a nearly invisible interruption of a user experience of the logical partitions, and that is highly scalable.

In accordance with embodiments of the invention, a migration process transforms data associated with a source logical partition into partition state records by way of a source migration services partition. The partition state records are then transmitted by the source migration services partition to a target migration services partition. The target migration services partition processes the partition state records and transforms them back into data associated with the source logical partition, and loads the data onto the target logical partition.

In one embodiment, data management of the partition migration is enabled by sending the configuration data, memory data, and execution state data associated with the source logical partition. First, the configuration data is transformed into partition state records, transmitted, and processed. Second, the memory data is transformed into partition state records, transmitted, and processed. Then, the source logical partition execution is suspended. The execution state data is then transformed into partition state records, transmitted, and processed. The target logical partition is started before the migration is completed. In this way, there is minimal disruption due to downtime of execution during migration of data from the source logical partition to the target logical partition.

In one embodiment, the partition state records may be created or processed in parallel. In this embodiment, each migration services partition may be assigned multiple logical processors by a partition manager, or "hypervisor," enabling parallel processing in the migration services partitions and further reducing disruption by increasing the speed of the overall migration. The hypervisor additionally enables high scalability of the migration process.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

DETAILED DESCRIPTION

Features of the present invention include an apparatus, program product and method for managing data during logical partition migrations between source and target logical partition by utilizing a source migration services partition ("MSP") and a target MSP. Each MSP may be allocated resources by a partition manager ("hypervisor") on one or more computers to facilitate a logical partition migration.

A logical partition may run in a virtualized environment to be separate from the physical hardware underneath. During a migration, the hypervisor may be responsible for providing the infrastructure for one or more MSPs that enables the migration to occur from the source logical partition to a typically new, target logical partition. A logical partition migration may occur in a single computer or across a network.

In one embodiment, a logical partition migration that occurs on a single computer may be utilized when it is desired to migrate a logical partition from one hard disk drive to another, for example. In this embodiment, there is only need for a single hypervisor to allocate resources to each MSP. In an alternate embodiment, a logical partition migration that occurs across a network may be utilized when it is desired to switch execution of the source logical partition on a source computer to the target logical partition on a target computer. When the logical partition migration is configured to proceed across a network, there is typically a source computer and target computer for the logical partition migration. In this embodiment, a hypervisor may be configured on both the source and target computers. The hypervisor may access the MSP on both the source computer and target computer. Alternately, the hypervisor on the source and target computer may create the respective MSPs. Despite the embodiment, there will typically be a "source" MSP and a "target" MSP to enable the logical partition migration.

The source MSP may access the source logical partition and transfer data from the source logical partition while it is executing and without interrupting the user. The target MSP may receive data from the source MSP and access the target logical partition to process and write data corresponding to the source logical partition. The target logical partition may be newly created for the migration, having "skeletal" characteristics so as to accommodate the transferred logical partition. In one embodiment, the hypervisor typically matches the configuration of the source and target logical partitions. In this way, the logical partition migration is highly scalable.

Hardware and Software Environment

Figure 1:
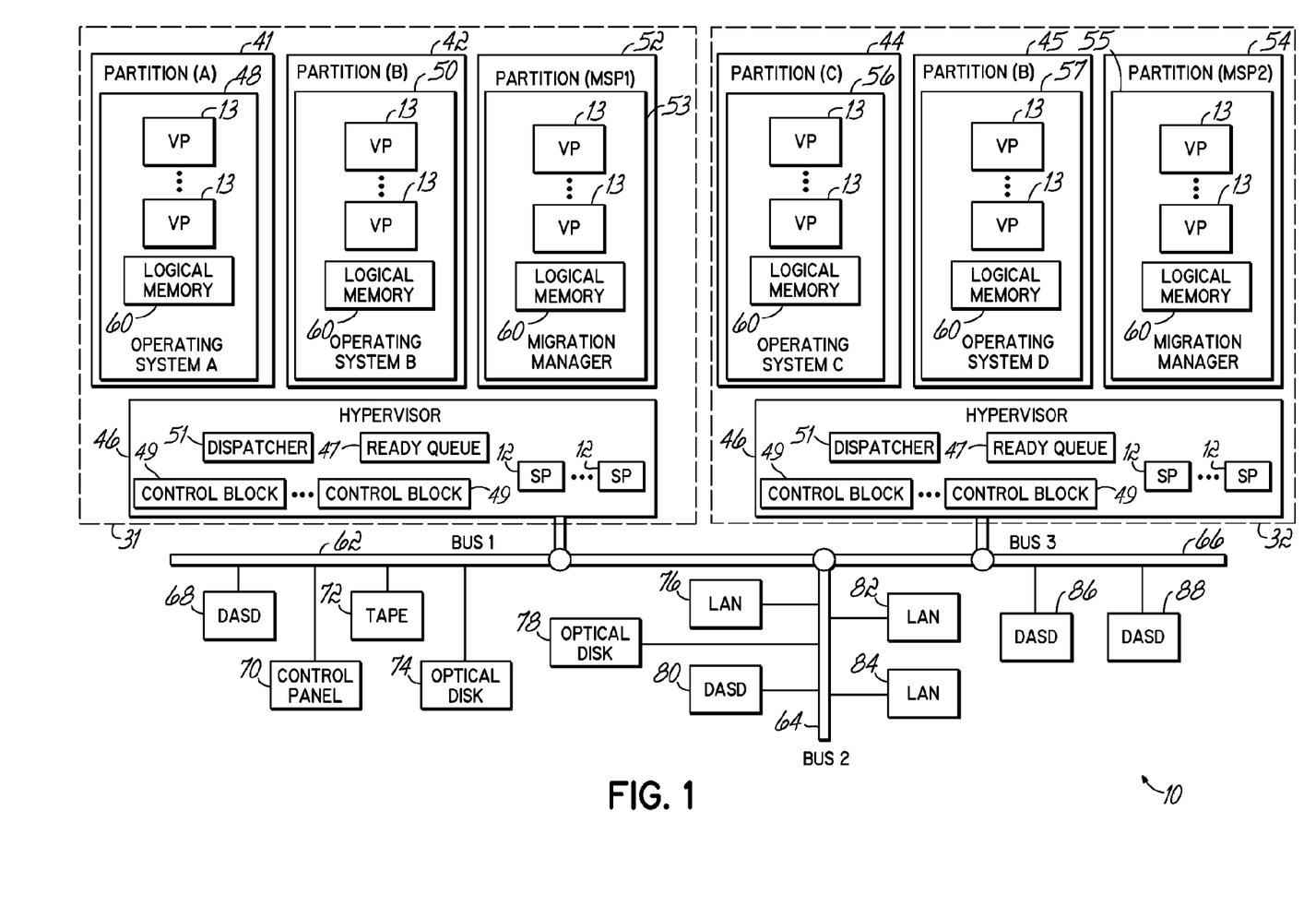
FIG. 1 is an exemplary block diagram of a computer system configured to manage data during a logical partition migration in a manner that is consistent with principles of the invention.

Turning more particularly to the drawings, wherein like numbers denote like parts throughout the several views, FIG. 1 illustrates a data processing system 10, or apparatus, configured to accomplish a data migration operation in accordance with the principles of the present invention. System 10 more particularly represents the primary software components and resources used to implement a logically partitioned environment consistent with embodiments of the invention. As such, FIG. 1 includes a computing architecture characterized as a virtual machine design, as developed by International Business Machines Corporation. The networked system 10 includes a plurality of partitions 41, 42, 52 and 44, 45, 54 that may share common processing resources among multiple processes within their respective server computers 31, 32. Each computer 31, 32 may rely upon a single computing machine having one or more physical processors 12, or central processing units (CPU's). The physical processors 12 may execute software configured to simulate multiple virtual processors 13.

The partitions 41, 42, 44, 45, 52, 54 may logically comprise a portion of a system's physical processors 12, memory and other resources as assigned by an administrator. A partition 41, 42, 44, 45 may host an operating system 48, 50, 56, 57 and may have multiple virtual processors 13. In this manner, each partition 41, 42, 44, 45 may operate largely as if it is a separate computer. A second type of partition, called a migration services partition ("MSP") 52, 45 may not host an operating system yet be assigned multiple virtual processors 13. In this manner, the MSP 52, 54 may operate to transfer a partition between physical servers with minimal impact during a live partition migration ("LPM").

Underlying programs, called hypervisors 46, or partition managers, may assign physical resources to each partition 41, 42, 44, 45, 52, 54. For instance, a hypervisor 46 may intercept requests for resources from operating systems 48, 50, 56, 57 to globally share and allocate resources. If the partitions 41, 42, 52 and 44, 45, 54 within each server 31, 32 are respectively sharing processors 12, the hypervisor 46 allocates physical processor cycles between the virtual processors 13 of the partitions 41, 42, 52 and 44, 45, 54 sharing the physical processors 12. Hypervisors 46 may include their own firmware 35, 36 and appropriate compatibility tables 37, 38 as with the partitions 41, 42, 44, 45, 52, 54. Moreover, for purposes of this specification, the partitions may use either or both the firmware of the partition and hypervisor.

At least one MSP 52, 54 is utilized to migrate data from a source logical partition to a target logical partition. The MSPs 52, 54 may be created by the hypervisor 46 and allocated resources to enable the logical partition migration. To this end, a migration manager 53, 55 may be used by each respective MSP 52, 54 to coordinate data records and transmissions.

During a logical partition migration, source partition data to be migrated is broken up into small records that can be individually prepared, transmitted, and then processed. These data records contain only what is necessary to identify that piece of data for processing. A data record may be referred to as a partition state record ("PSR"), or "partition record." The source migration manager 53 typically tracks the PSRs that need to be sent and is responsible for coordinating resending of data updated by the source partition. The migration managers 53, 55 are operative to coordinate records and transmissions of PSRs from a source partition to a target partition, track what state the partition migration is in, track all data that has been updated by the source partition, track all data that has been sent or received, and/or otherwise complete a logical partition migration.

Each operating system 48, 50, 56, 57 controls the primary operations of its respective logical partition 41, 42, 44, 45 in a manner similar to the operating system of a non-partitioned computer. Each logical partition 41, 42, 44, 45 may execute in a separate memory space, represented by logical memory 60. Moreover, each logical partition 41, 42, 44, 45 may be statically and/or dynamically allocated a portion of the available resources in its respective computer 31, 32 of networked system 10. For example and as discussed herein, each logical partition 41, 42, 44, 45 may share one or more physical processors 12, as well as a portion of the available memory space for use in logical memory 60. In this manner, a given processor may be utilized by more than one logical partition.

Each MSP 52, 54 is allocated resources by its respective hypervisor 46. Each MSP 52, 54 may execute in a separate memory space, represented by logical memory 60. Moreover, each MSP 52, 54 may be statically and/or dynamically allocated a portion of the available resources in its respective computer 31, 32 of networked system 10. For example and as discussed herein, each MSP 52, 54 may share one or more physical processors 12, as well as a portion of the available memory space for use in logical memory 60. In this manner, a given processor may be utilized by more than one partition.

The hypervisors 46 may include a dispatcher 51 that manages the dispatching of virtual processors to physical processors on a dispatch list, or ready queue 47. The ready queue 47 comprises memory that includes a list of virtual processors having work that is waiting to be dispatched on a physical processor 12. The hypervisors 46 shown in FIG. 1 also include physical processors 12, in addition to processor control blocks 49. The processor control blocks 49 comprise memory that includes a list of virtual processors waiting for access on a particular physical processor 12.

Additional resources, e.g., mass storage, backup storage, user input, network connections, and the like, are typically allocated to one or more logical partitions in a manner well known in the art. Resources can be allocated in a number of manners, e.g., on a bus-by-bus basis, or on a resource-by-resource basis, with multiple logical partitions sharing resources on the same bus. Some resources may even be allocated to multiple logical partitions at a time. FIG. 1 illustrates, for example, three logical buses 62, 64 and 66, with a plurality of resources on bus 62, including a direct access storage device (DASD) 68, a control panel 70, a tape drive 72 and an optical disk drive 74, allocated to a partition. Bus 64, on the other hand, may have resources allocated on a resource-by-resource basis, e.g., with local area network (LAN) adaptor 76, optical disk drive 78 and DASD 80 allocated to logical partition 42, and LAN adaptors 82 and 84 allocated to logical partition 44. Bus 66 may represent, for example, a bus allocated specifically to logical partition 44, such that all resources on the bus, e.g., DASD's 86 and 88, are allocated to the same logical partition.

It will be appreciated that the illustration of specific resources in FIG. 1 is merely exemplary in nature, and that any combination and arrangement of resources may be allocated to any logical partition in the alternative. For instance, it will be appreciated by one of skill in the art that in some implementations resources can be reallocated on a dynamic basis to service the needs of other logical partitions. Furthermore, it will be appreciated that resources may also be represented in terms of the input/output processors (IOP's) used to interface the computer with the specific hardware devices.

The various software components and resources illustrated in FIG. 1 may be implemented in a number of manners, including using various computer software applications, routines, components, programs, objects, modules, data structures, etc., referred to hereinafter as "computer programs", "tools", "programs" or "program code". Program code typically comprises one or more instructions that are resident at various times in various memory and storage devices in the computer, and that, when read and executed by one or more processors in the computer, cause that computer to perform the steps necessary to execute steps or elements embodying the various aspects of the invention.

Moreover, while the invention has and hereinafter will be described in the context of fully functioning computers, those skilled in the art will appreciate that the various embodiments of the invention are capable of being distributed as a program product in a variety of forms, and that the invention applies equally regardless of the particular type of computer readable medium used to actually carry out the distribution. Examples of computer readable media include, but are not limited to tangible, recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environment illustrated in FIG. 1 is not intended to limit the present invention. Though not shown in FIG. 1, for instance, one skilled in the art will appreciate that other partitions may be included within other embodiments, including a partition that comprises part of the hypervisors 46. This hypervisor partition may function in many ways like the conventional partitions 41, 42, 44, 45 (and associated operating systems), but has no user interface for the customer to protect it from failures that might otherwise come about through user interaction. Additionally, while not shown in FIG. 1, data management of a logical partition migration consistent with embodiments of the invention may proceed in one computer, rather than as shown from server 31 to server 32. In such a case, an embodiment of the logical partition migration executable in system 10 would proceed with one hypervisor and one or more MSPs. Furthermore, while four logical partitions 41, 42, 44, 45 and two MSPs 52, 54 are shown in FIG. 1, one skilled in the art will appreciate that more or fewer partitions may be implemented as needed. Other alternative hardware and/or software environments may thus be used without departing from the scope of the invention.

Migrating a Logical Partition with Migration Service Partitions

Processes consistent with the invention may allow the source migration manager 53 to classify partition data that can be readily moved, e.g., that data that is infrequently modified (i.e., such as configuration data) and data that is modified occasionally (i.e., such as memory of the partition). In so doing, the migration manager 53 may identify data to be moved during a migration while a source logical partition is actively executing. Additionally, the migration manager 53 may identify data to be moved during a migration while a source logical partition has its execution suspended. This suspended period may coincide with a time when remaining data, which is presumably more complicated to transfer (i.e., such as the execution state of the partition), is most efficiently migrated by the migration managers 54, 55. In this manner, embodiments consistent with the invention may ease the burden and time required to migrate data from a source partition to a target partition.

Figure 2:
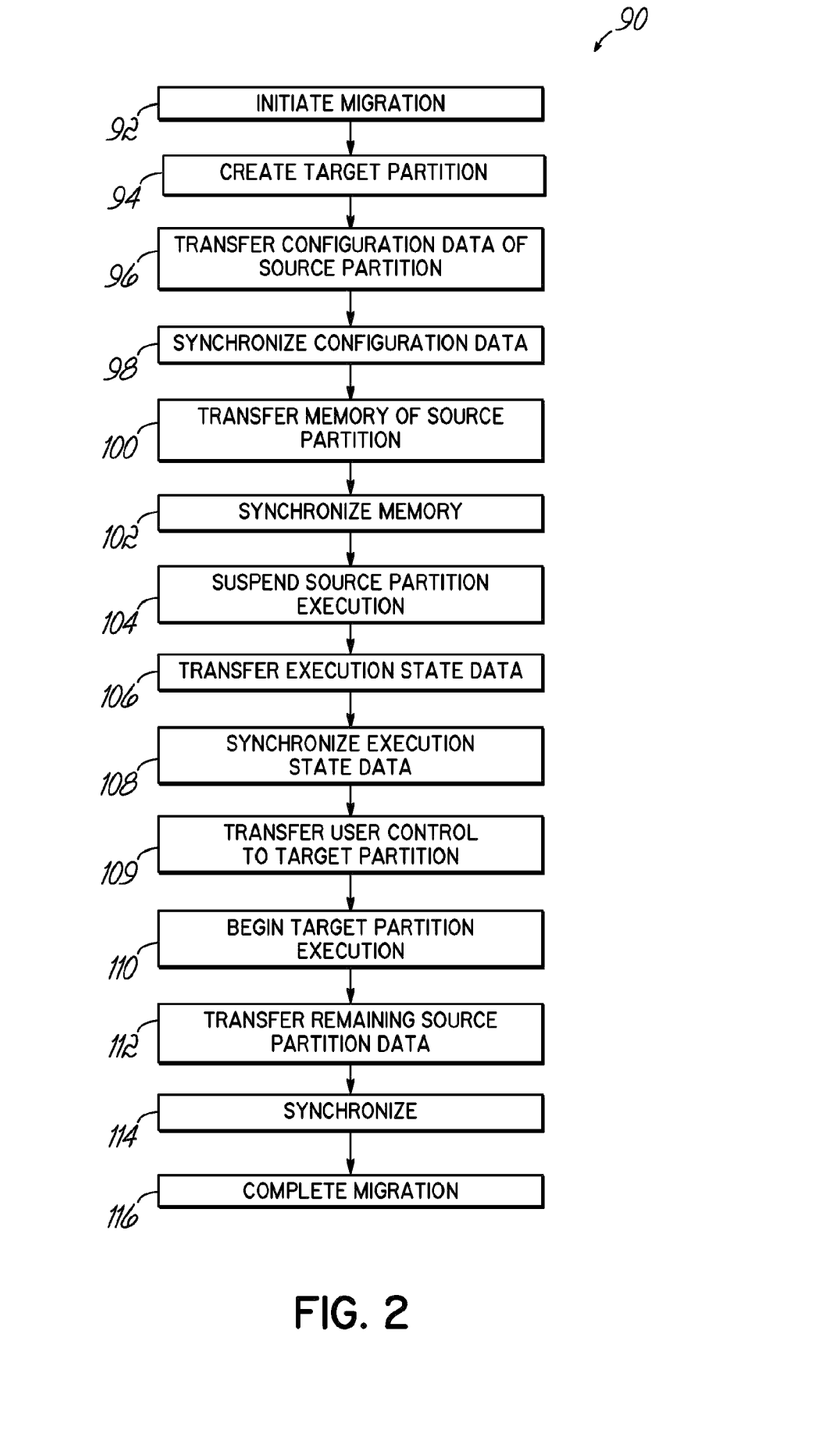
FIG. 2 is a flowchart having steps executable by the system of FIG. 1 for data management during a logical partition migration of the local partition of FIG. 1.

FIG. 2 is a flowchart 90 having steps executable by the system of FIG. 1 for data management and logical partition migration of the logical partition 42 of FIG. 1. Generally during a migration, the state of the migrating logical partition 42 is transferred to a newly created logical partition 44. The execution of the source migrating partition 42 ideally continues with little or no interruption on the target logical partition 44 during the logical partition migration.

Turning more particularly to the flowchart 90, migration processes may be initiated in block 92. Initiation processes may include prompting the migration manager 53 on the source MSP 52 to communicate with the migration manager 55 on the target MSP 54. Thus, the migration managers 53, 55 may begin coordinating and otherwise facilitating the migration.

As such, a migration manager 53, 55 may initiate the creation of the target partition 44 in block 94 of FIG. 2. As discussed herein, the target partition 44 is typically located on a separate, physical computer 32, and may comprise a relatively empty framework for accommodating the transferred logical partition 42. Where so configured, the target logical partition 44 may include data used by the system 10 to ensure basic compatibility between the target and source logical partitions 42, 44. In block 94, a target partition 44 is typically created by a call from a migration manager 53, 55 to a hypervisor 46 requesting that the target partition 44 mirror memory 60 and virtual processor 13 configuration of the source partition 42.

Figure 3:
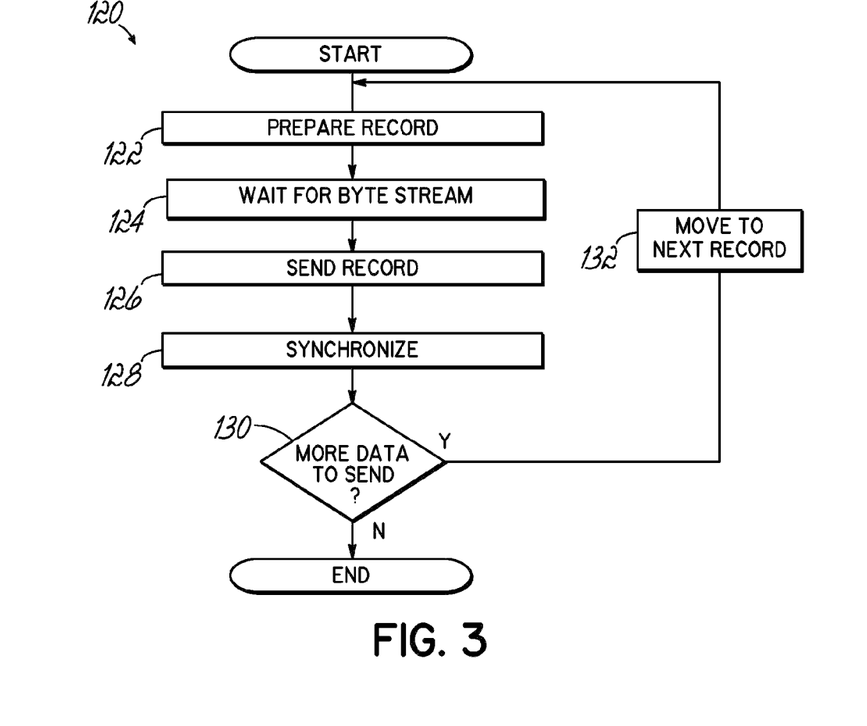
FIG. 3 is a flowchart having steps executable by the system of FIG. 1 for preparing and sending partition state records consistent with embodiments of the invention during a logical partition migration of the logical partition of FIG. 1.

Data that is seldom modified, e.g. memory maps, compatibility data, or processor, clock and I/O configuration of the source partition may be migrated in block 96. FIG. 3 is a flowchart 120 having steps generally executable by the source migration manager 53 of FIG. 1 for preparing and sending data when executing a migration of the logical partition 42. In block 122, data (which may be configuration data, memory, or execution state data) is transformed into a PSR. The source migration manager 53 accesses the source logical partition 42 and creates a PSR out of the requested data without interrupting the source logical partition 42. Where so configured, the migration manager 53 is operable to copy the data from a running logical partition (in this case source partition 42) by way of virtualization and store it in the logical memory 60 of the source MSP 52, then process the data into a PSR at the source MSP 52. In block 124 the source migration manager 53 analyzes the byte stream to the target MSP 54 to determine when it is clear. When the byte stream is clear, the source migration manager transmits the PSR to the target MSP 54 in block 126. In one embodiment, data may be copied from the source logical partition 22, transformed into PSRs, and the PSRs transmit to the target MSP 54 in parallel when the MSPs 52, 54 are configured to have more than one virtual processor 13.

In block 128, the target migration manager 55 receives the PSR at the target MSP 54, processes it, and loads the data from the PSR into the target logical partition 44. Also in block 128, the target migration manager responds to the source migration manager 53 that it is synchronized. In one embodiment, PSRs may be received, processed, and data from the PSRs loaded into the target logical partition 44 in parallel when the MSPs 52, 54 are configured to have more than one virtual processor 13.

In block 130, the source migration manager 53 determines whether there is more data to migrate. When there is more data to migrate, the source migration manager 53 moves to the next record of data in block 132 and continues to prepare the new data in block 122. When there is no more data to migrate the source migration manager 53 moves to the next block at 98 in FIG. 2.

Referring again to FIG. 2, the configuration data in the source logical partition 42 and target logical partition 44 are synchronized in block 98. To complete the configuration data synchronization, a high priority request may be sent from the source migration manager 53 to the target migration manager 55. The source migration manager 53 may indicate in the high priority request whether any configuration data has changed since it was migrated. If the configuration data has changed, a PSR with the changed configuration data may be sent from the source MSP 52 to the target MSP 54.

In block 100, the memory of the source partition 42 is migrated to the target partition 44 in a similar manner as described in FIG. 3. Memory of the source partition 42 is generally data that is modified occasionally. This data may include partition RAM (i.e., mainstore memory that is being used by the source partition 42), I/O mappings (i.e., table entries being used to map memory for I/O by partition), and other partition tables (i.e., such as translation control entry tables, or hashed page tables used for partition management). Returning to FIG. 2, the memory in the source logical partition 42 and target logical partition 44 may be synchronized in block 102. To complete the memory data synchronization, a high priority request may be sent by the source migration manager 53 to the target migration manager 55. The source migration manager 53 may indicate in the high priority request whether any memory data has changed since it was migrated. If the memory data has changed, a PSR with the changed memory data may be sent from the source MSP 52 to the target MSP 54.

After configuration data and memory have migrated from the source partition 42, the source partition execution is suspended in block 104. In block 106, the execution state of the source partition 42 is migrated to the target partition 44 in a similar manner as described in FIG. 3. The execution state data may include the processor state (i.e., processor registers, along with the current instruction being executed), I/O state (i.e., control data and queues for I/O), control structures (i.e., buffers for memory, applications, or queries), interrupt state (i.e., current interrupts pending and associated states), non-volatile RAM used by the partition, and recently changed data that is required for execution but has not yet been transferred. Migrating the execution state data enables the target partition 44 to begin execution at the same place the target partition 42 was suspended.

Returning to FIG. 2, the execution state data in the source logical partition 42 and target logical partition 44 is synchronized in block 108. To complete the execution state data synchronization, a high priority request may be sent by the source migration manager 53 to the target migration manager 55 indicating that all execution state data has migrated. In block 109, user control is migrated from the source logical partition 42 to the target logical partition 44. In block 110, the target partition logical partition 44 begins execution where the source logical partition 42 was suspended. In block 112, all remaining source partition data is migrated from the source partition 42 to the target partition 44. The data migrated in block 112 may be configuration data or memory data of the source partition 42 that was changed after their respective synchronization, but data that was not execution state data or data required for execution. In block 114, the source migration manager 53 determines whether all data from source partition 42 has been migrated to the target partition 44. When there is no more data to be migrated the logical partition migration may complete in block 116.

Figure 4:
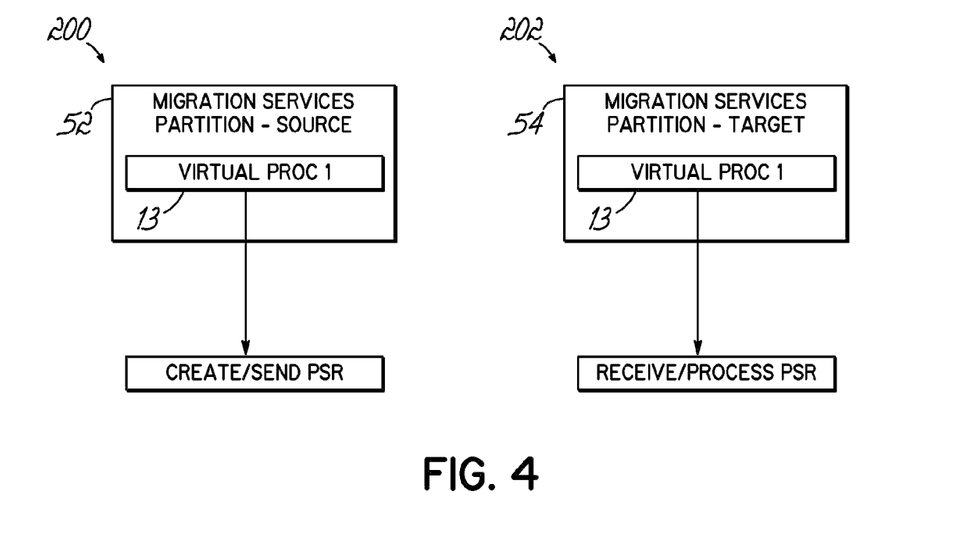
FIG. 4 is a diagrammatic illustration of one embodiment of the migration services partitions of the system of FIG. 1 illustrating the creation, sending, receiving, and processing of a partition state record when a single logical processor is allocated for each migration services partition during a logical partition migration.

As previously discussed, each partition 41, 42, 44, 45 and MSP 52, 54 can be configured by the hypervisor 46 to operate with multiple logical processors 13. In MSPs 52, 54 with multiple logical processors 13, multiple PSRs may be created or processed by the migration services partitions 53, 55 in parallel. In this way, the migration managers 53, 55 are configured to create, transmit, receive, and process PSRs in parallel when the MSPs 52, 54 are configured with multiple logical processors 13. FIG. 4 is a diagrammatic illustration of one embodiment of the MSPs 52, 54 of the system 10 of FIG.

1 illustrating the creation, transmission, reception, and processing of a PSR when the hypervisor 46 allocates one virtual processor 13 for each MSP 52, 54 during a logical partition migration. Returning to FIG. 4, at 200 there is shown a source MSP 52 having a single virtual processor 13. In this configuration, the source migration manager 53 (not shown in FIG. 4) of the MSP 52 is operable to create and send one PSR at a time. At 202, there is shown a target MSP 54 having a single virtual processor 13. In this configuration, the target migration manager 55 (not shown in FIG. 4) of the MSP 54 is operable to receive and process one PSR at a time.

Figure 5:
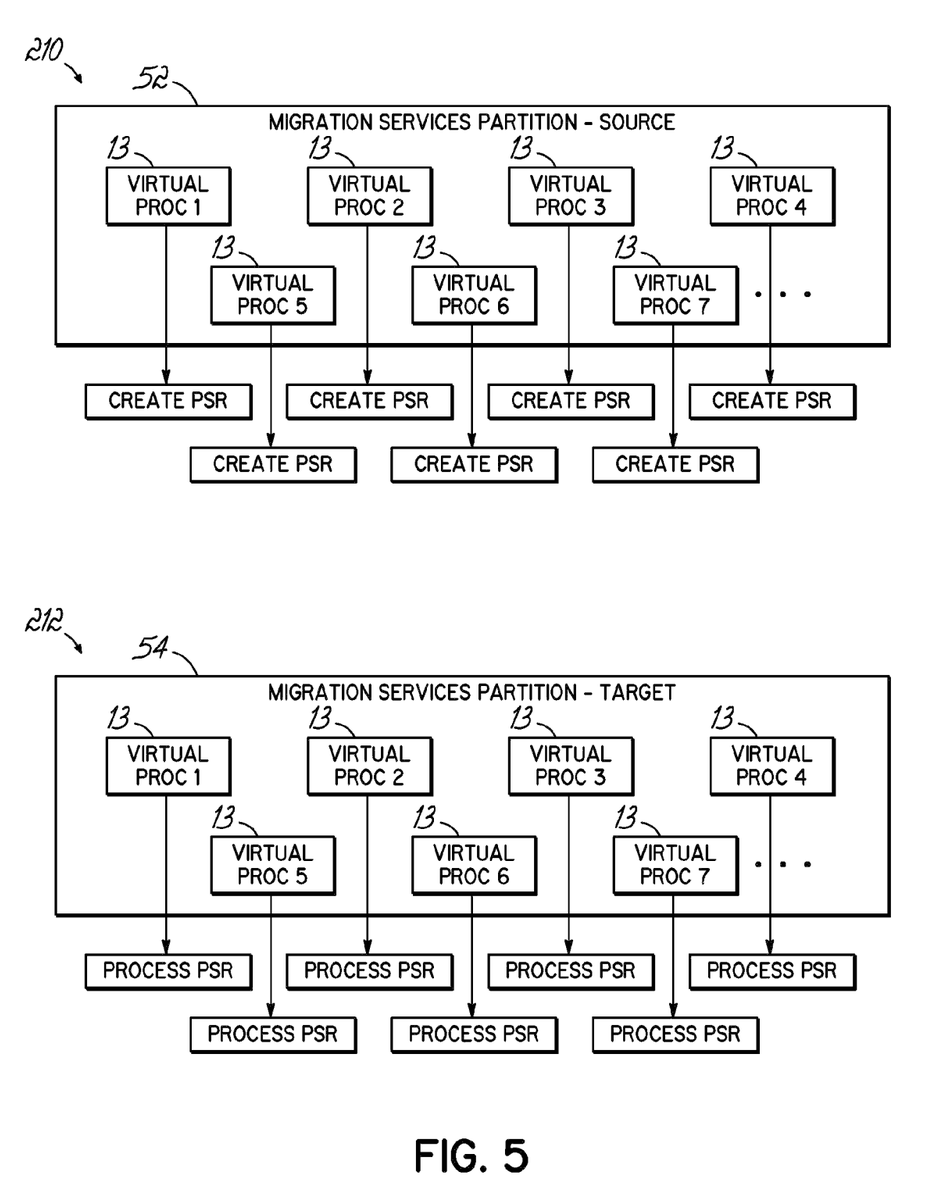
FIG. 5 is a diagrammatic illustration of one embodiment of the migration services partitions of the system of FIG. 1 illustrating the creation, sending, receiving, and processing of a partition state record when multiple logical processors are allocated for each migration services partition during a logical partition migration.

FIG. 5 is a diagrammatic illustration of one embodiment of the MSPs 52, 54 of the system 10 of FIG. 1 illustrating the creation, transmission, reception, and processing of PSRs when the hypervisor 46 allocates multiple virtual processors 13 for each MSP 52, 54 during a logical partition migration. Returning to FIG. 5, at 210 there is shown a source MSP 52 having more than one virtual processor 13. In this configuration, the source migration manager 53 (not shown in FIG. 5) of the MSP 52 is operable to create and send one PSR for each virtual processor 13. As such, at 210 the source MSP 52 may create and send multiple PSRs in parallel by utilizing each virtual processor 13. At 212, there is shown a target MSP 54 having more than one virtual processor 13. In this configuration, the target migration manager 55 (not shown in FIG. 5) of the MSP 54 is operable to receive and process multiple PSRs in parallel by utilizing each virtual processor 13. The use of multiple virtual processors may greatly decrease the time required for a logical partition migration consistent with one embodiment of the invention.

While the present invention has been illustrated by a description of various embodiments and while these embodiments have been described in considerable detail, it is not the intention of the applicants to restrict, or in any way limit, the scope of the appended claims to such detail. For instance, another embodiment consistent with the invention supports migration between logical partitions on the same computer. As such, additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of managing data during a migration of data from a source logical partition to a target logical partition, the method comprising:
   transforming data associated with the source logical partition into a plurality of partition records with a source migration services partition by copying the data associated with the source logical partition, storing the data associated with the source logical partition in logical memory of the source migration services partition, and forming the plurality of partition records from the data associated with the source logical partition stored in the logical memory of the source migration services partition; and
   transmitting the plurality of partition records from the source migration services partition to a target migration services partition to cause the target migration services partition to process the plurality of partition records by transforming the plurality of partition records into the data associated with the source logical partition and loading the data associated with the source logical partition into the target logical partition.

2. The method of claim 1, wherein the source migration services partition transforms the data associated with the source logical partition into the plurality of partition records in parallel, and wherein the source migration services partition transmits the plurality of partition records in parallel.

3. The method of claim 1, wherein the data associated with the source logical partition includes data associated with a memory of the source logical partition, and wherein the plurality of partition records collectively define a copy of the data associated with the memory of the source logical partition.

4. The method of claim 1, wherein the data associated with the source logical partition includes data associated with an execution state of the source logical partition, and wherein the plurality of partition records collectively define a copy of the data associated with the execution state of the source logical partition.

5. The method of claim 1, wherein the data associated with the source logical partition includes configuration data of the source logical partition, and wherein the plurality of partition records are configuration partition records that collectively define a copy of the configuration data.

6. The method of claim 5, further comprising:
   in response to transmitting the plurality of configuration partition records, transforming data associated with a memory of the source logical partition into a plurality of memory partition records with the source migration services partition; and
   transmitting the plurality of memory partition records from the source migration services partition to the target migration services partition to cause the target partition migration services partition to process the plurality of memory partition records by transforming the plurality of memory partition records into the data associated with the memory of the source logical partition and loading the data associated with the memory of the source logical partition into the target logical partition.

7. The method of claim 6, further comprising:
   in response to transmitting the plurality of memory partition records, suspending execution of the source logical partition.

8. The method of claim 7, further comprising:
   transforming data associated with an execution state of the source logical partition into at least one execution state partition record with the source migration services partition; and
   transmitting the at least one execution state partition record from the source migration services partition to the target migration services partition to cause the target migration services partition to process the at least one execution state partition record by transforming the at least one execution state partition record into the data associated with the execution state of the source logical partition and loading the data associated with the execution state of the source logical partition into the target logical partition.

9. The method of claim 8, further comprising:
   transferring control of a user from the source logical partition to the target logical partition; and
   in response to transmitting the at least one execution state partition record, initiating execution of the target logical partition.

10. The method of claim 1, further comprising:
    detecting that the data associated with the source logical partition has been altered;
    in response to detecting the alteration of the data associated with the source logical partition, transforming the data associated with the source logical partition that has been altered into at least one replacement partition record; and transmitting the at least one replacement partition record from the source migration services partition to the target migration services partition to cause the target migration partition to process the at least one replacement partition record in the target migration services partition by transforming the at least one replacement partition record into the data associated with the source logical partition that has been altered and to replace at least a portion of data associated with the target logical partition.

11. The method of claim 1, wherein user access to the source logical partition is maintained during at least a portion of the migration.

12. The method of claim 1, wherein the source logical partition is configured on a first computer and the target logical partition is configured on a second computer.

13. An apparatus, comprising:

at least one processor; and program code configured to be executed by the at least one processor to manage data during a migration of data from a source logical partition to a target logical partition by transforming data associated with the source logical partition into a plurality of partition records with a source migration services partition by copying the data associated with the source logical partition, storing the data associated with the source logical partition in logical memory of the source migration services partition, and forming the plurality of partition records from the data associated with the source logical partition stored in the logical memory of the source migration services partition, and transmitting the plurality of partition records from the source migration services partition to a target migration services partition to cause the target migration services partition to process the plurality of partition records by transforming the plurality of partition records into the data associated with the source logical partition and loading the data associated with the source logical partition into the target logical partition.

14. The apparatus of claim 13, wherein the target logical partition and the target migration services partition are configured on the same computer as the source logical partition and the source migration services partition.

15. The apparatus of claim 13, wherein the target logical partition and the target migration services partition are configured on a different computer from the source logical partition and the source migration services partition.

16. The apparatus of claim 13, wherein the data associated with the source logical partition includes configuration data of the source logical partition, and wherein the plurality of partition records are configuration partition records that collectively define a copy of the configuration data.

17. The apparatus of claim 16, wherein the program code is further configured to transform data associated with a memory of the source logical partition into a plurality of memory partition records with the source migration services partition in response to transmitting the configuration partition records, and transmit the plurality of memory partition records from the source migration services partition to the target migration services partition to cause the target migration services partition to process the plurality of memory partition records by transforming the plurality of memory partition records into the data associated with the memory of the source logical partition and loading the data associated with the memory of the source logical partition into the target logical partition.

18. The apparatus of claim 17, wherein the program code is further configured to suspend execution of the source logical partition in response to transmitting the plurality of memory partition records.

19. The apparatus of claim 18, wherein the program code is further configured to transform data associated with an execution state of the source logical partition into at least one execution state partition record with the source migration services partition, and transmit the at least one execution state partition record from the source migration services partition to the target migration services partition to cause the target migration services partition to process the at least one execution state partition record by transforming the at least one execution state partition record into the data associated with the execution state of the source logical partition and loading the data associated with the execution state of the source logical partition into the target logical partition.

20. The apparatus of claim 19, wherein the program code is further configured to transfer control of a user from the source logical partition to the target logical partition, and initiate execution of the target logical partition in response to transmitting the at least one execution state partition record.

21. A program product, comprising:

program code configured to be executed by at least one processor to manage data during a migration of data from a source logical partition to a target logical partition by transforming data associated with the source logical partition into a plurality of partition records with a source migration services partition by copying the data associated with the source logical partition, storing the data associated with the source logical partition in logical memory of the source migration services partition, and forming the plurality of partition records from the data associated with the source logical partition stored in the logical memory of the source migration services partition, and transmitting the plurality of partition records from the source migration services partition to a target migration services partition to cause the target migration services partition to process the plurality of partition records by transforming the plurality of partition records into the data associated with the source logical partition and loading the data associated with the source logical partition into the target logical partition; and a computer recordable medium bearing the program code.

* * * * *